(12) United States Patent
Sedghi

(10) Patent No.: US 7,073,122 B1
(45) Date of Patent: Jul. 4, 2006

(54) METHOD AND APPARATUS FOR EXTRACTING STRUCTURED DATA FROM HTML PAGES

(76) Inventor: Ali R. Sedghi, 321 N. Clark Ave., Los Altos, CA (US) 94022

( * ) Notice: Subject to any disclaimer, the term of this patent is extended or adjusted under 35 U.S.C. 154(b) by 514 days.

(21) Appl. No.: 10/363,880

(22) PCT Filed: Sep. 8, 2000

(86) PCT No.: PCT/US00/24614

§ 371 (c)(1),
(2), (4) Date: Mar. 7, 2003

(87) PCT Pub. No.: WO02/21291

PCT Pub. Date: Mar. 14, 2002

(51) Int. Cl.
*G06F 15/00* (2006.01)

(52) U.S. Cl. .................. 715/513; 715/501.1

(58) Field of Classification Search ............ 715/513, 715/514, 501.1
See application file for complete search history.

(56) References Cited

U.S. PATENT DOCUMENTS

| | | | |
|---|---|---|---|
| 5,079,700 A | 1/1992 | Kozoll et al. | |
| 5,113,341 A | 5/1992 | Kozol et al. | |
| 5,140,521 A | 8/1992 | Kozol et al. | |
| 5,276,793 A | 1/1994 | Borgendale et al. | |
| 5,343,554 A | 8/1994 | Koza et al. | |
| 5,379,373 A * | 1/1995 | Hayashi et al. | 715/513 |
| 5,530,852 A | 6/1996 | Meske, Jr. et al. | |
| 5,553,216 A * | 9/1996 | Yoshioka et al. | 715/515 |
| 5,557,720 A | 9/1996 | Brown, Jr. et al. | |
| 5,557,722 A | 9/1996 | DeRose et al. | |
| 5,644,776 A | 7/1997 | DeRose et al. | |
| 5,649,186 A | 7/1997 | Ferguson | |
| 5,671,416 A | 9/1997 | Elson | |
| 5,680,619 A | 10/1997 | Gudmundson et al. | |
| 5,708,806 A | 1/1998 | DeRose et al. | |
| 5,758,361 A * | 5/1998 | van Hoff | 715/513 |
| 5,784,608 A | 7/1998 | Meske, Jr. et al. | |

(Continued)

FOREIGN PATENT DOCUMENTS

EP 0 539 120 A1 4/1993

(Continued)

OTHER PUBLICATIONS

Miller et al., A Novel Use of Statistical Parsing to Extract Information from Text, ACM Apr. 2000, pp. 226-233.*

(Continued)

*Primary Examiner*—Cong-Lac Huynh
(74) *Attorney, Agent, or Firm*—Richard C. Litman

(57) ABSTRACT

A method and apparatus for extracting structured data from HTML pages whereby an HTML file belonging to a predetermined class of HTML files can be transformed into an instance tree (142). Other than the HTML file, there are two other inputs to the extraction procedure: a set of constraints (134), and a structure template (140). The steps in the process include: parsing the HTML file, thereby creating a parse tree (126); annotating the parse tree, thereby creating an annotated parse tree (130); creating an array of nodes from the annotated parse tree using a set of constraints (134); and generating an instance tree (142) from the array of nodes using the structure template (140). The instance tree (142) encodes, in a form that may be used by other computer programs, all the relevant information in the HTML file as prescribed by the set of constraints (134) and makes explicit the structure of this information.

18 Claims, 16 Drawing Sheets

U.S. PATENT DOCUMENTS

| | | | |
|---|---|---|---|
| 5,794,006 A | | 8/1998 | Sanderman |
| 5,826,256 A | * | 10/1998 | Devanbu ........................ 707/4 |
| 5,907,704 A | | 5/1999 | Gudmundson et al. |
| 5,907,837 A | | 5/1999 | Ferrel et al. |
| 5,920,879 A | * | 7/1999 | Kyojima et al. ............ 715/517 |
| 5,923,738 A | | 7/1999 | Cardillo, IV et al. |
| 5,926,823 A | | 7/1999 | Okumura et al. |
| 5,930,341 A | | 7/1999 | Cardillo, IV et al. |
| 5,937,041 A | | 8/1999 | Cardillo, IV et al. |
| 5,953,322 A | | 9/1999 | Kimball |
| 5,953,732 A | | 9/1999 | Meske, Jr. et al. |
| 5,970,490 A | | 10/1999 | Morgenstern |
| 5,978,579 A | | 11/1999 | Buxton et al. |
| 5,983,248 A | | 11/1999 | DeRose et al. |
| 6,041,331 A | | 3/2000 | Weiner et al. |
| 6,065,024 A | | 5/2000 | Renshaw |
| 6,081,815 A | | 6/2000 | Spitznagel et al. |
| 6,083,276 A | | 7/2000 | Davidson et al. |
| 6,093,215 A | | 7/2000 | Buxton et al. |
| 6,128,655 A | | 10/2000 | Fields et al. |
| 6,421,656 B1 | * | 7/2002 | Cheng et al. ................... 707/2 |
| 6,424,980 B1 | * | 7/2002 | Iizuka et al. ................. 715/513 |
| 6,651,108 B1 | * | 11/2003 | Popp et al. .................. 719/315 |
| 6,748,374 B1 | * | 6/2004 | Madan et al. ................... 707/3 |
| 6,763,343 B1 | * | 7/2004 | Brooke et al. ................. 707/1 |
| 6,782,505 B1 | * | 8/2004 | Miranker et al. ............ 715/513 |
| 2001/0018698 A1 | * | 8/2001 | Uchino et al. .............. 707/533 |
| 2001/0054172 A1 | * | 12/2001 | Tuatini ......................... 717/1 |
| 2002/0073074 A1 | * | 6/2002 | Sweet et al. ................... 707/2 |
| 2005/0027512 A1 | * | 2/2005 | Waise ............................ 704/9 |

FOREIGN PATENT DOCUMENTS

EP      0 718 783      6/1996

OTHER PUBLICATIONS

Magernan, Statistical Decision-Tree Models for Parsing, ACM Jun. 1995, pp. 276-283.*

Joshi et al., Phrase Structure Trees Bear More Fruit than You Would Have Thought, American Journal of Computational Linguistics, Mar. 1982, pp. 1-11.*

Purtilo et al., Parse-Tree Annotations, ACM Dec. 1989, pp. 1467-1477.*

* cited by examiner

METHOD AND APPARATUS FOR EXTRACTING STRUCTURED DATA FROM HTML PAGES

TECHNICAL FIELD

The present invention relates to a process whereby a Hypertext Markup Language (HTML) file belonging to a pre-determined class of HTML files can be transformed into an instance tree that contains all the relevant extracted information, and that makes explicit the internal structure of the data.

BACKGROUND ART

It is often useful to extract the information contained in HTML pages in a form that can be used as input to a computer program that can analyze and reformat it for further use. One such use is an automated agent that extracts the relevant information and stores it for data-mining purposes. For example, a program might be devised that monitors movies on screen at various locations. Such a program needs to extract from the relevant HTML page the titles of the movies, the theaters where they are shown, and the times at which they are screened. Another example is a program that extracts the information contained in an HTML page to display it on devices other than a computer screen, e.g. the screen of a hand-held device. Since hand held devices have much smaller screens than typical desk top computers, it is necessary to extract only the relevant information and filter all the rest, and to re-format this information in a form suitable for display on the hand held device. In the movie example above, the list of theaters in each location, the movies shown at each theater, and the screening times are the relevant information, and all the rest of the material in the HTML page, e.g. promotions, discussions, etc. need to be filtered out. Furthermore, the extracted information needs to be structured in a way that the relationship between theaters, movies, and show times is explicit, so that menus can be generated that allow the user to navigate the screens to find, for example, the show times of a given movie at a given theater.

Therefore, as well as filtering out irrelevant data from the HTML page, it is necessary to structure the extracted information in such a way that the underlying relationship between the various items of data is made explicit. For example, it is not enough to extract the names of theaters, the titles of movies and the show times. The resulting data structure must also make explicit the relationship between theaters, movies and showtimes, i.e., which movies are shown at each theater, and which show times apply to which movie at which theater.

There is a need for a process whereby an HTML file belonging to a pre-determined class of HTML files can be transformed into an instance tree that contains all the relevant extracted information, and that makes explicit the internal structure of the data. The related art is represented by the following patents of interest.

U.S. Pat. No. 5,079,700, issued on Jan. 7, 1992 to Michael J. Kozoll et al., describes a method for copying a marked portion of a structured document so as to prevent damaging the structure of the document at the target location where the contents of the mark are to be inserted. The Kozoll et al. '700 patent does not suggest a method and apparatus for extracting structured data from HTML pages according to the claimed invention.

U.S. Pat. No. 5,113,341, issued on May 12, 1992 to Michael J. Kozol et al., describes a method for hierarchically expanding and contracting element marks in a structured document. The Kozol et al. '341 patent does not suggest a method and apparatus for extracting structured data from HTML pages according to the claimed invention.

U.S. Pat. No. 5,140,521, issued on Aug. 18, 1992 to Michael J. Kozol et al., describes a method for deleting a marked portion of a structured document so as to prevent damaging the structure of the document. The Kozol et al. '521 patent does not suggest a method and apparatus for extracting structured data from HTML pages according to the claimed invention.

U.S. Pat. No. 5,276,793, issued on Jan. 4, 1994 to Kenneth W. Borgendale et al., describes a method and apparatus for editing a structured document to preserve the intended appearance of document elements. The Borgendale et al. patent does not suggest a method and apparatus for extracting structured data from HTML pages according to the claimed invention.

U.S. Pat. No. 5,276,793, issued on Jan. 4, 1994 to Kenneth W. Borgendale et al., describes a method and apparatus for editing a structured document to preserve the intended appearance of document elements. The Borgendale et al. patent does not suggest a method and apparatus for extracting structured data from HTML pages according to the claimed invention.

U.S. Pat. No. 5,530,852, issued on Jun. 25, 1996 to Carl F. Meske, Jr. et al., describes a method for extracting profiles and topics from a first file written in a first markup language and generating files in different markup languages containing the profiles and topics for use in accessing data described by the profiles and topics. The Meske, Jr. et al. '852 patent does not suggest a method and apparatus for extracting structured data from HTML pages according to the claimed invention.

U.S. Pat. No. 5,557,720, issued on Sep. 17, 1996 to Allen L. Brown, Jr. et al., describes a method for determining whether a document tree is weakly valid. The Brown, Jr. et al. patent does not suggest a method and apparatus for extracting structured data from HTML pages according to the claimed invention.

U.S. Pat. No. 5,557,722, issued on Sep. 17, 1996 to Steven De Rose et al., describes a data processing system and method for representing and generating a representation of, and random access rendering of, electronic documents. The Rose et al. '722 patent does not suggest a method and apparatus for extracting structured data from HTML pages according to the claimed invention.

U.S. Pat. No. 5,644,776, issued on Jul. 1, 1997 to Steven De Rose et al., describes a data processing system and method for random access formatting of a portion of a large hierarchical electronically published document with descriptive markup. The Rose et al. '776 patent does not suggest a method and apparatus for extracting structured data from HTML pages according to the claimed invention.

U.S. Pat. No. 5,649,186, issued on Jul. 15, 1997 to Gregory J. Ferguson, describes a system and computer-based method for providing a dynamic information clipping service. The Ferguson patent does not suggest a method and apparatus for extracting structured data from HTML pages according to the claimed invention.

U.S. Pat. No. 5,671,416, issued on Sep. 23, 1997 to David Elson, describes a method and apparatus for searching and modifying source code of a computer program. The Elson patent does not suggest a method and apparatus for extracting structured data from HTML pages according to the claimed invention.

U.S. Pat. No. 5,680,619, issued on Oct. 21, 1997 to Norman K. Gudmundson et al., describes an application development system that enables its users to create reusable "object containers" merely by defining links among instantiated objects. The Gudmundson et al. '619 patent does not suggest a method and apparatus for extracting structured data from HTML pages according to the claimed invention.

U.S. Pat. No. 5,708,806, issued on Jan. 13, 1998 to Steven DeRose et al., describes a data processing system and method for generating a representation of an electronic document, for indexing the electronic document to generate the representation for navigating the electronic document using its representation and for displaying the electronic document, formatted according to a style sheet, on an output device. The DeRose et al. '806 patent does not suggest a method and apparatus for extracting structured data from HTML pages according to the claimed invention.

U.S. Pat. No. 5,784,608, issued on Jul. 21, 1998 to Carl F. Meske, Jr. et al., describes a system and computer-implemented method for retrieving hypertext information using profiles and topics. The Meske, Jr. et al. '608 patent does not suggest a method and apparatus for extracting structured data from HTML pages according to the claimed invention.

U.S. Pat. No. 5,794,006, issued on Aug. 11, 1998 to David S. Sanderman, describes an on-line content editing system which operates as an extension of a computer's operating system to provide a graphical interface which displays system operator editing menus. The Sanderman patent does not suggest a method and apparatus for extracting structured data from HTML pages according to the claimed invention.

U.S. Pat. No. 5,794,704, issued on May 25, 1999 to Norman K. Gudmundson et al., describes an on-line content editing system which operates as an extension of a computer's operating system to provide a graphical interface which displays system operator editing menus. The Gudmundson et al. '704 patent does not suggest a method and apparatus for extracting structured data from HTML pages according to the claimed invention.

U.S. Pat. No. 5,923,738, issued on Jul. 13, 1999 to Raymond A. Cardillo IV et al., describes a screen-display telephone terminal for interfacing with the Internet. The Cardillo IV et al. '738 patent does not suggest a method and apparatus for extracting structured data from HTML pages according to the claimed invention.

U.S. Pat. No. 5,926,823, issued on Jul. 20, 1999 to Yo Okumura et al., describes a document generic logical information editing apparatus for editing document generic logical information for document editing purposes in such a manner that the arrangements for designating automatic document editing processes such as search, manipulation, and composition of document elements are simplified using the edited information; that the procedures for transferring and removing unnecessary data are eliminated; and that users' chores associated with extra tasks of such data handling are alleviated. The Okumura et al. patent does not suggest a method and apparatus for extracting structured data from HTML pages according to the claimed invention.

U.S. Pat. No. 5,930,341, issued on Jul. 27, 1999 to Raymond A. Cardillo IV et al., describes a browser device and method for interfacing screen-display telephone terminals with the Internet. The Cardillo IV et al. '341 patent does not suggest a method and apparatus for extracting structured data from HTML pages according to the claimed invention.

U.S. Pat. No. 5,937,041, issued on Aug. 10, 1999 to Raymond A. Cardillo IV et al., describes a system and method for interfacing screen-display telephone terminals with the Internet. The Cardillo IV et al. '041 patent does not suggest a method and apparatus for extracting structured data from HTML pages according to the claimed invention.

U.S. Pat. No. 5,953,322, issued on Sep. 14, 1999 to Robert H. Kimball, describes a cellular telephone that provides the capability of performing Internet telephone calls. The Kimball patent does not suggest a method and apparatus for extracting structured data from HTML pages according to the claimed invention.

U.S. Pat. No. 5,953,732, issued on Sep. 14, 1999 to Carl F. Meske, Jr. et al., describes a system and computer-implemented method for retrieving hypertext information using profiles and topics. The Meske, Jr. et al. '608 patent does not suggest a method and apparatus for extracting structured data from HTML pages according to the claimed invention.

U.S. Pat. No. 5,970,490, issued on Oct. 19, 1999 to Matthew Morganstern, describes a method for integrating heterogeneous data embodied in computer readable media having source data and target data including providing an interoperability assistant module with specifications for transforming the source data, transforming the source data into a common intermediate representation of the data using the specifications, transforming the intermediate representation of the data into a specialized target representation using the specification. The Morganstern patent does not suggest a method and apparatus for extracting structured data from HTML pages according to the claimed invention.

U.S. Pat. No. 5,978,579, issued on Nov. 2, 1999 to Jeffrey J. Buxton et al., describes a component customization and distribution system in an object-oriented environment that provides a template builder utility which enables a base component to be selectively modified and the modifications to the base component stored as a template. The Buxton et al. '579 patent does not suggest a method and apparatus for extracting structured data from HTML pages according to the claimed invention.

U.S. Pat. No. 5,983,248, issued on Nov. 9, 1999 to Steven DeRose et al., describes a data processing system and method for generating a representation of an electronic document, for indexing the electronic document, for navigating the electronic document using its representation and for displaying the electronic document on an output device. The DeRose et al. '248 patent does not suggest a method and apparatus for extracting structured data from HTML pages according to the claimed invention.

U.S. Pat. No. 6,041,331, issued on Mar. 21, 2000 to Michael L. Weiner et al., describes a method for extracting information from a plurality of documents for display. The Weiner et al. patent does not suggest a method and apparatus for extracting structured data from HTML pages according to the claimed invention.

U.S. Pat. No. 6,065,024, issued on May 16, 2000 to David S. Renshaw, describes a method and apparatus for realizing embedded HTML documents. The Renshaw patent does not suggest a method and apparatus for extracting structured data from HTML pages according to the claimed invention.

U.S. Pat. No. 6,081,815, issued on Jun. 27, 2000 to Kim L. Spitznagel et al., describes a method for processing a hyperlink formatted message to make it compatible with an alphanumeric messaging device that lacks hyperlink decoding capability. The Spitznagel et al. patent does not suggest a method and apparatus for extracting structured data from HTML pages according to the claimed invention.

U.S. Pat. No. 6,083,276, issued on Jul. 4, 2000 to Harold R. Davidson et al., describes a method and apparatus for creating and configuring a component-based application through a simple, XML-compliant, text based document. The Davidson et al. patent does not suggest a method and apparatus for extracting structured data from HTML pages according to the claimed invention.

U.S. Pat. No. 6,093,215, issued on Jul. 25, 2000 to Jeffrey J. Buxton et al., describes a component customization and distribution system in an object-oriented environment that provides a template builder utility which enables a base component to be selectively modified and the modifications to the base component stored as a template. The Buxton et al. '215 patent does not suggest a method and apparatus for extracting structured data from HTML pages according to the claimed invention.

European Patent document 0 539 120 A1, published on Apr. 28, 1993, describes an apparatus for discovering information about the source code of a computer program. The European '120 patent document does not suggest a method and apparatus for extracting structured data from HTML pages according to the claimed invention.

European Patent document 0 718 783 A1, published on Jun. 26, 1996, describes a system and computer-implemented method for retrieving hypertext information using profiles and topics. The European '783 patent document does not suggest a method and apparatus for extracting structured data from HTML pages according to the claimed invention.

None of the above inventions and patents, taken either singularly or in combination, is seen to describe the instant invention as claimed.

DISCLOSURE OF INVENTION

The present invention is a process whereby an HTML file belonging to a pre-determined class of HTML files can be transformed into an instance tree that contains all the relevant extracted information, and that makes explicit the internal structure of the data. Other than the HTML file, there are two other inputs to the extraction procedure: a set of constraints, and a structure template. The constraint set and structure template are encoded in a single document, created by a separate process and not the subject of this invention. This document is called the extraction template. The steps in the process include: parsing the HTML file, thereby creating a parse tree; annotating the parse tree, thereby creating an annotated parse tree; creating an array of nodes from the annotated parse tree using the set of constraints; and generating an instance tree from the array of nodes using the structure template. The instance tree encodes, in a form that may be used by other computer programs, all the relevant information in the HTML file as prescribed by the set of constraints and makes explicit the structure of this information.

BRIEF DESCRIPTION OF DRAWINGS

Similar reference characters denote corresponding features consistently throughout the attached drawings.

BEST MODES(S) FOR CARRYING OUT THE INVENTION

Figure 1:
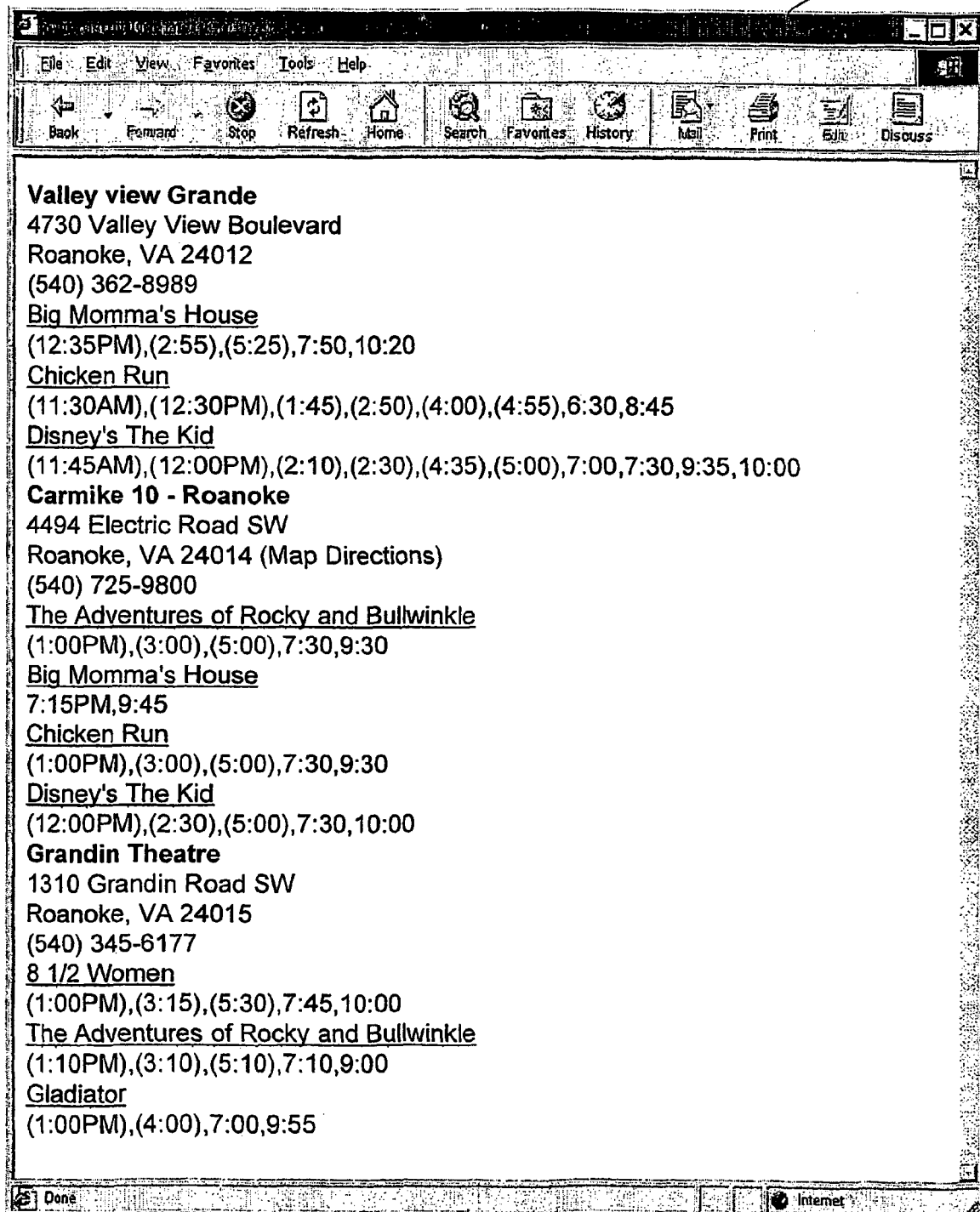
FIG. 1 is an example movie web page from which structure data will be extracted using the method of the present invention.

The present invention is a process whereby an HTML file belonging to a pre-determined class of HTML files can be transformed into an instance tree that contains all the relevant extracted information, and that makes explicit the internal structure of the data. The invention disclosed herein is, of course, susceptible of embodiment in many different forms. Shown in the drawings and described hereinbelow in detail is a preferred embodiment of the invention. It is to be understood, however, that the present disclosure is an exemplification of the principles of the invention and does not limit the invention to the illustrated embodiment.

Other than the HTML file, there are two other inputs to the extraction procedure: a set of constraints, and a structure template. The constraint set and structure template are encoded in a single document, created by a separate process and not the subject of this invention. This document is called the extraction template.

The extraction template must apply to more than one HTML file, otherwise the effort used in creating it might have been spent in creating the instance tree manually. Part of the usefulness of the current invention stems from the fact that a single extraction template can be created that applies to a large number of HTML files, as long as these files have been created with the same underlying format. For example, a single extraction template can be created that applies to HTML files generated by a popular web site that lists movie theaters, the movies playing at these theaters and their show times at any location in the United States. It is possible to develop the extraction template once, and use it over and over again for extracting theater and movie information from this web site. Until the designers of the site change the underlying format of this page, the extraction template remains useful.

The process described by this invention comprises the following steps:

(1) Parsing the input HTML file using a standard HTML parser, thereby creating a parse tree;

(2) Using a procedure defined by AnotateTree, annotating the parse tree generated in step (1), and creating an annotated parse tree;

(3) Using the procedure defined by GetNodeArray, creating an array of nodes from the parse tree generated in step (2) and a set of constraints C; and, (4) Using the procedure defined by Instantiate, generating an instance tree by instantiating a given structure template S with respect to the node array generated by step (3).

The instance tree generated by step (4) is the output of the procedure that is the basis of this invention. It encodes, in a form that can be used by other computer programs, all the relevant information (as prescribed by the set of constraints C) contained in the original HTML file, and makes explicit the structure of this information, i.e. the relationship of different parts of the information to each other, as prescribed by the structure template S, through the process shown in FIG. 7.

In order to describe the steps of the procedure outlined above in more detail, we need to clarify our notation and make some definitions.

Figure 3A:
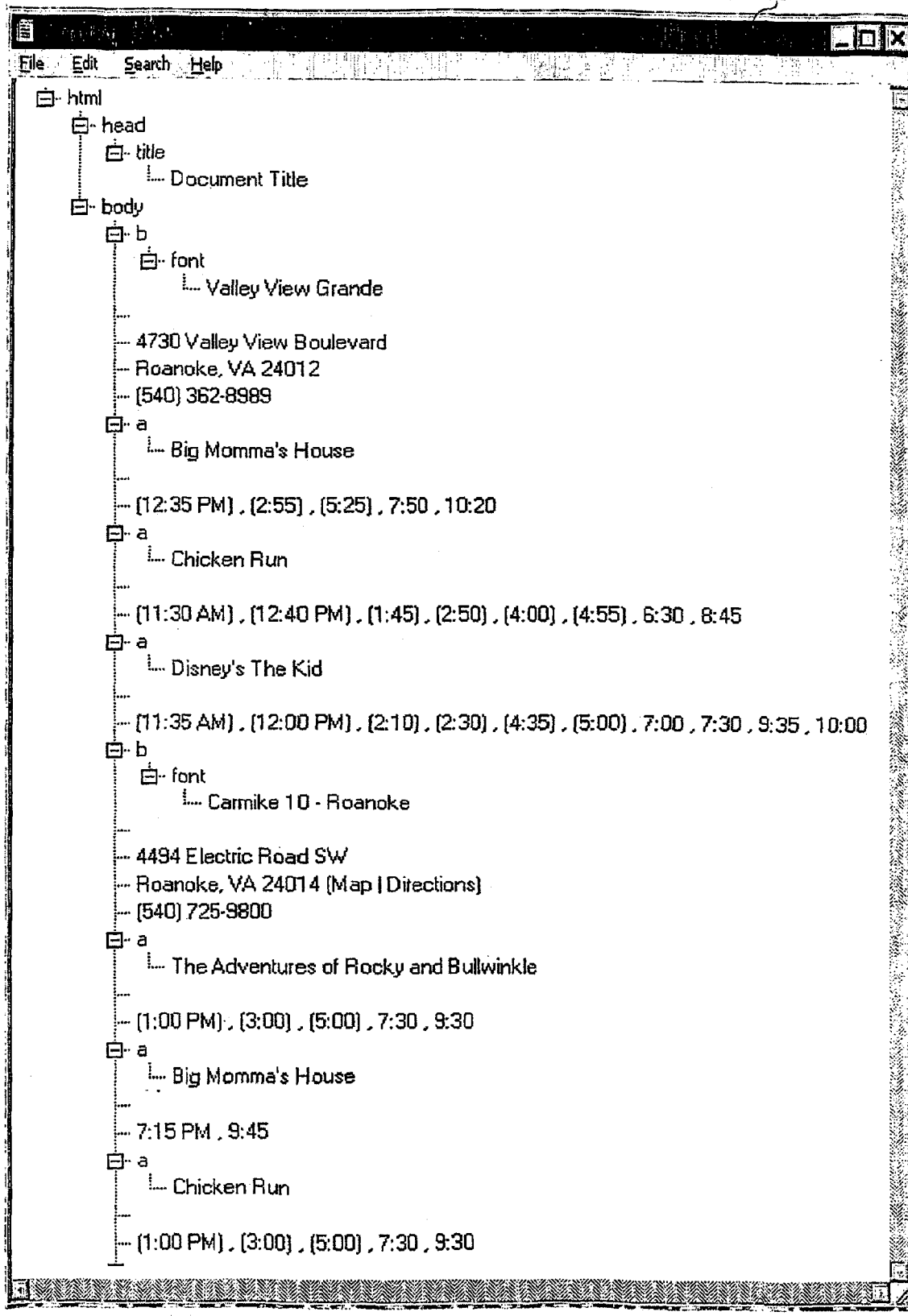
FIGS. 3a and 3b show a parse tree of the movie web page example of FIG. 1.
Figure 3B:
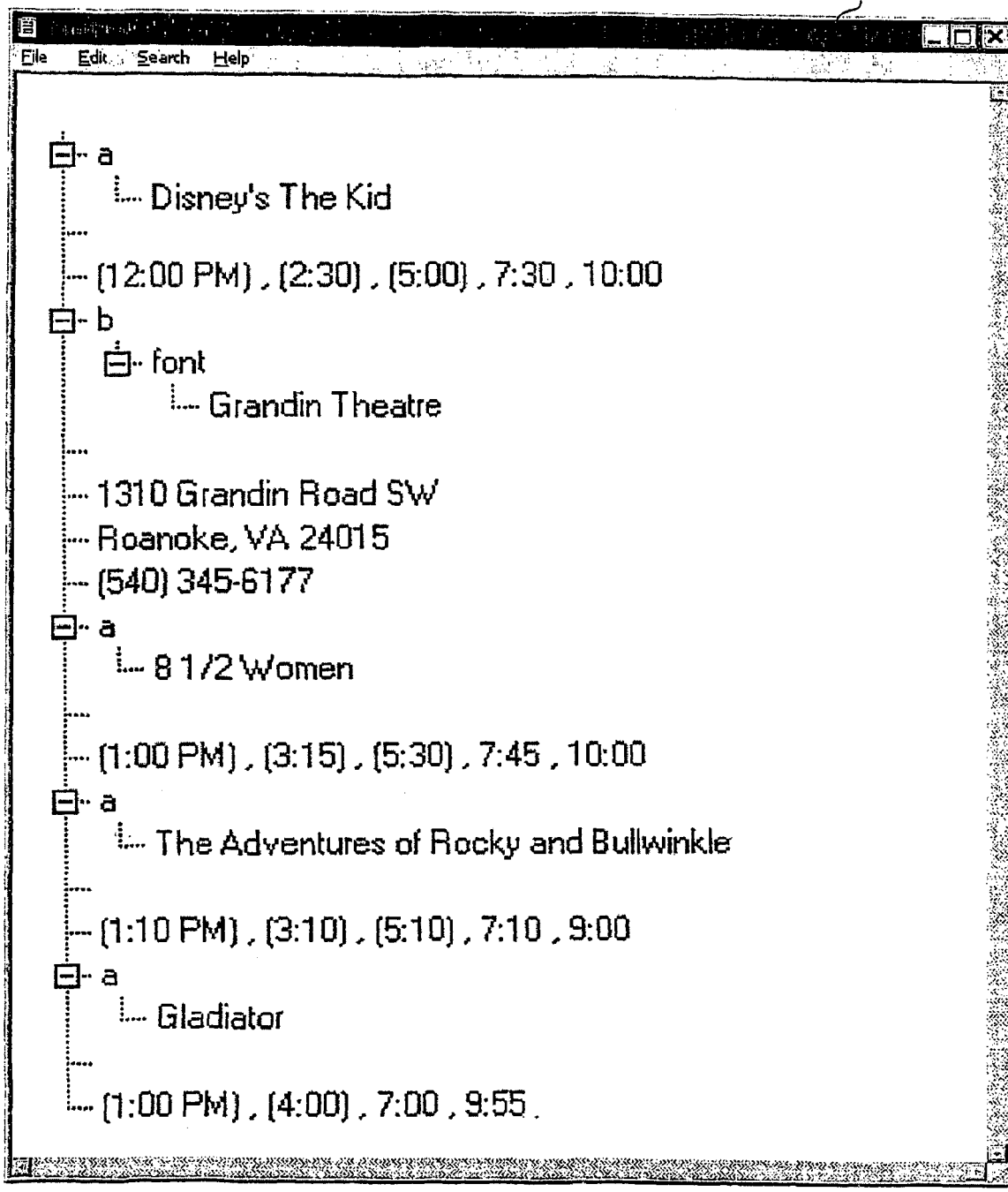

HTML parse tree. HTML is a standard language for text markup, and has a standard grammar. A page encoded in HTML can be parsed by a standard HTML parser, generating a data structure called a parse tree. Such HTML parsers are conventional and well known to those skilled in the art. See FIGS. 3a and 3b for an example of a parse tree 30, 32. A parse tree is a rooted tree composed of nodes. Every node has a tag (in standard HTML, text elements do not have tags but we assume a 'text' tag for text nodes in the parse tree. 'Text' tags are not shown in FIGS. 3a and 3b).

Figure 4A:
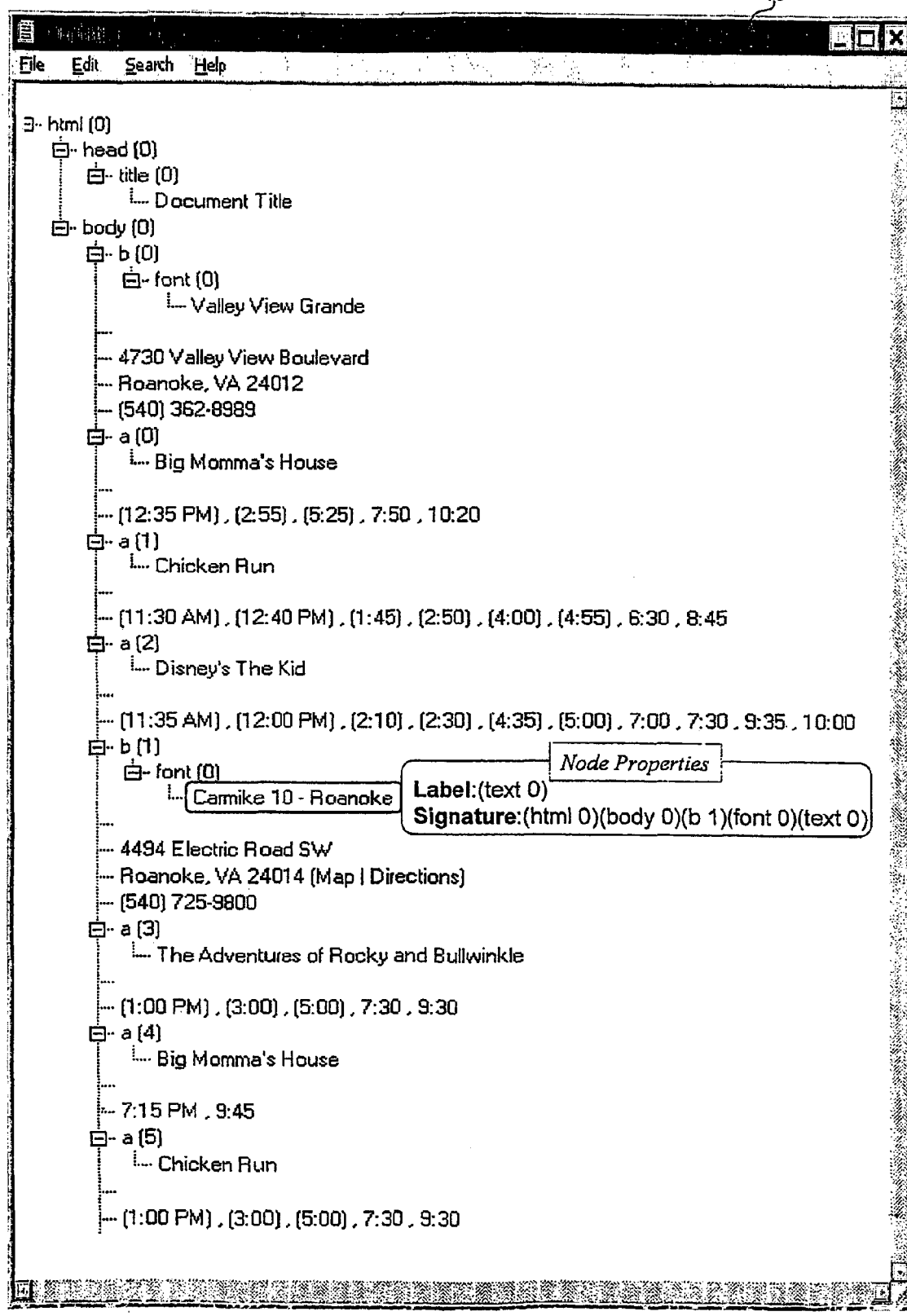
FIGS. 4a and 4b show an annotated parse tree according to the present invention of the movie web page example.

Node label. In step (2) of the procedure outlined above, we annotate the parse tree generated in step (1) with node labels. A node label is a pair (t,p), where t is the HTML tag for the node in question, and p is a positive integer that corresponds to the number of sibling nodes of the node preceding it with the same tag. See FIGS. 4a and 4b for an annotated parse tree 40, 42 which shows the labels of the nodes. In particular, FIG. 4a shows that the Label for the text entry "Carmike 10—Roanoke" is "(text 0)", signifying that the tag is "text" and that there are no other "text" tags preceding the "Carmike 10—Roanoke" entry under the (font 0) node descended from the (b 1) node.

Node signature. Every node in the parse tree has a Node Signature, which is an array of node labels. At the end of this array is the label of the node in the last position, preceding it is the label of the parent of the and so on, up to the label of the root node of the tree in the first position of the Array. See FIG. 4a for an example. In particular, FIG. 4a shows that the node signature for the "Carmike 10—Roanoke" text entry is "(html 0) (body 0) (b 1) (font 0) (text 0)", signifying that the label for the text entry is (text 0), which is descended from the (font 0) node, which is descended from the (b 1) node, which is descended from the (body 0) node, which is descended from the (html 0) node.

Node Text. Node text is the textual content of the node. For 'text' nodes in the same parse tree, i.e. nodes which have no HTML tag and no children but have text content, node text is the same thing as the text content of the node. For non-text nodes, node text is the aggregation of the texts of the children of the node.

Constraint. Constraints are intended to act as filters for nodes. If a constraint matches a node, it is accepted; if it does not match a node, it is rejected. Constraints can be a combination, using the logical operators &, |, ~(and, or, not), of basic constraints. There are two kinds of basic constraints: path constraints and text constraints.

Path Constraint. There are two types of path constraints: exact length path constraints, and prefix path constraints. Both types have associated with them an array $[M_1,M_2,M_3, \ldots M_K]$ of markers. A marker is a pair (T,P), where T is an HTML tag, and P is either a non-negative number or the character *. To distinguish exact length constraints from prefix constraints, in the textual representation we put an * at the end of the prefix constraint.

EXAMPLES

Exact length path constraint: [(html 0)(body 0)(b *)(font 0) (text 0)]

Prefix path constraint: [(html 0) (body 0)*]

Path constraints filter nodes based on the node's signature, according to the following rules:

An exact length constraint $[M_1,M_2,M_3, \ldots M_K]$ matches a node with signature $[L_1,L_2,L_3 \ldots L_J]$ if k=j, and $M_1$ matches $L_1$, $M_2$ matches $L_2$, ... $M_K$ matches $L_K$ A prefix constraint $[M_1,M_2,M_3, \ldots M_K]$ matches a node with signature $[L_1,L_2,L_3 \ldots L_J]$ if k≦j, and $M_1$ matches $L_1$, $M_2$ matches $L_2$, ... $M_K$ matches $L_K$ A marker $(T_m,P_m)$ matches a label $(T_1,P_1)$ if $T_1=T_m$ and $P_m=*$ or $P_1=P_m$

EXAMPLES the exact constraint [(html 0)(body 0) (b *) (font 0) (text 0)] matches a node with signature [(html 0) (body 0) (b 0) (font 0) (text 0)]

the prefix constraint [(html 0) (body 0)*] matches a node with signature [(html 0) (body 0) (a 0) (text 0)]

Text Constraint. A text constraint contains a regular expression. A node matches a text constraint if the constraint's regular expression matches the text of the node according to the rules of regular expressions.

Example: the regular expression {(\d\d\d)\d\d\d-\d\d\d\d} matches a node with text (540)362-8989

General Constraint Matching. As mentioned above, general constraints are built up from basic path and text constraints using logical operators &, |, and ~. The following rules are used for matching general constraints against nodes:

A node matches the constraint c1|c2 if it matches c1, c2, or both

A node matches the constraint c1 & c2 is it matches both c1 and c2

A node matches the constraint ~c1 if it does not match c1

Figure 8:
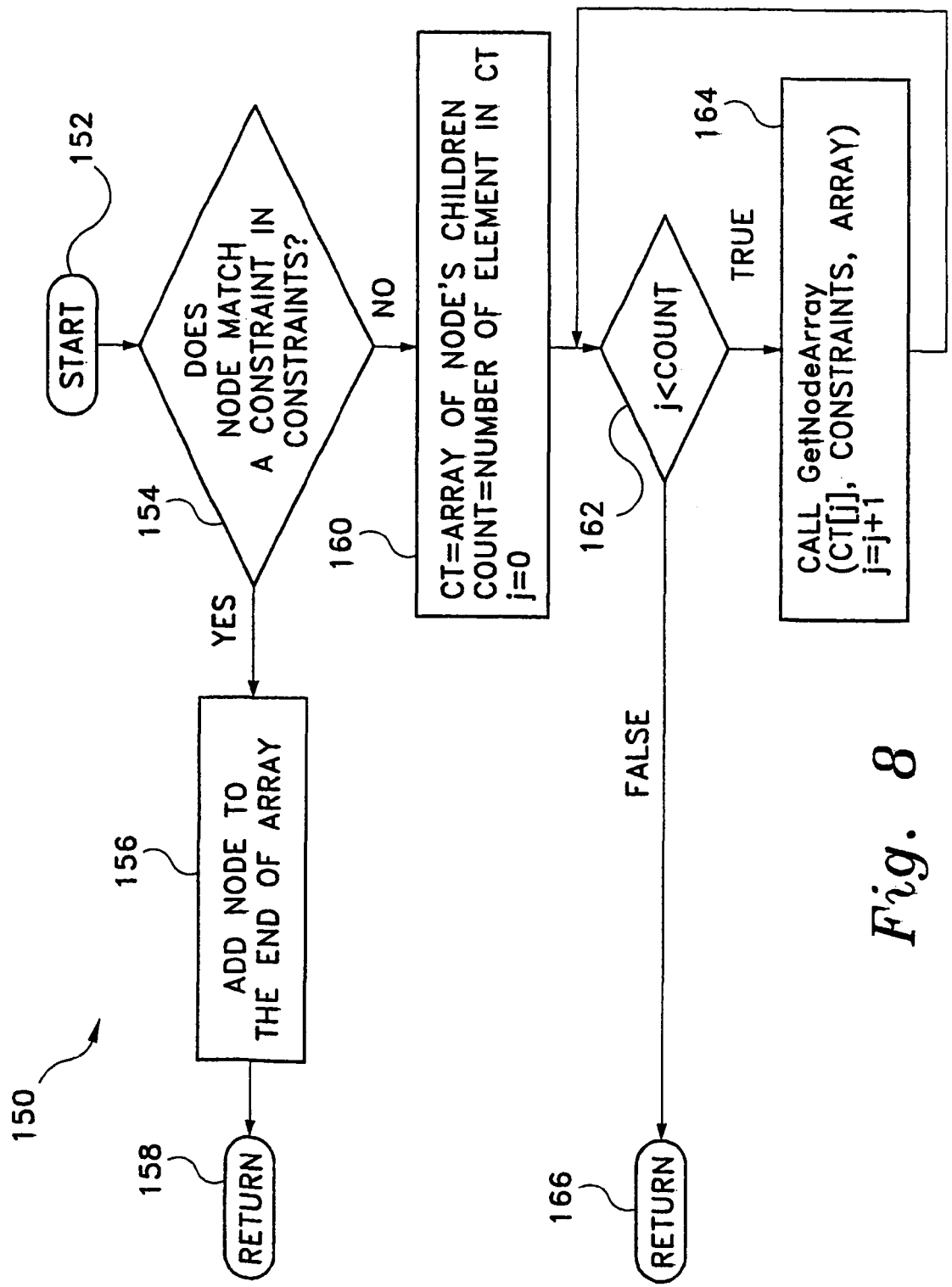
FIG. 8 is a flowchart of a GetNodeArray function for generating an array of nodes according to the present invention.

The filtered node array is an array of nodes generated by traversing the parse tree in the top to bottom, left to right fashion and matching every node traversed against each member of the set of constraints. If the node matches at least one constraint, then the node is added to the end of the array. If a node is added to the array, then its children (if any) are not traversed. The flowchart in FIG. 8 illustrates the function GetNodeArray, a recursive function used to create the filtered node array from the annotated parse tree and the constraint set.

Structure Template. The structure template is a tree of Structure Elements. There are four types of Structure Elements;

Repeat element;

Choice element;

Composite element; and,

ExField element.

The following rules apply to Structure Templates:

A repeat element can only have one child, which cannot be a repeat element

A composite element must have two or more children. There is no other restriction on the children of composite elements.

A choice element must have two or more children. There is no other restriction on the children of choice elements.

Every ExField element must have an associated constraint.

We use the following notation to represent structure elements:

SRepeat(E) represents a repeat structure element with child E;

SComposite([E1,E2, . . . Ek]) represents a composite structure element with children E1,E2, . . . Ek;

SChoice([E1,E2, . . . Ek]) represents a choice structure element with children E1,E2, . . . Ek; and, SExField(C) represents an ExField structure element with constraint C.

Figure 5:
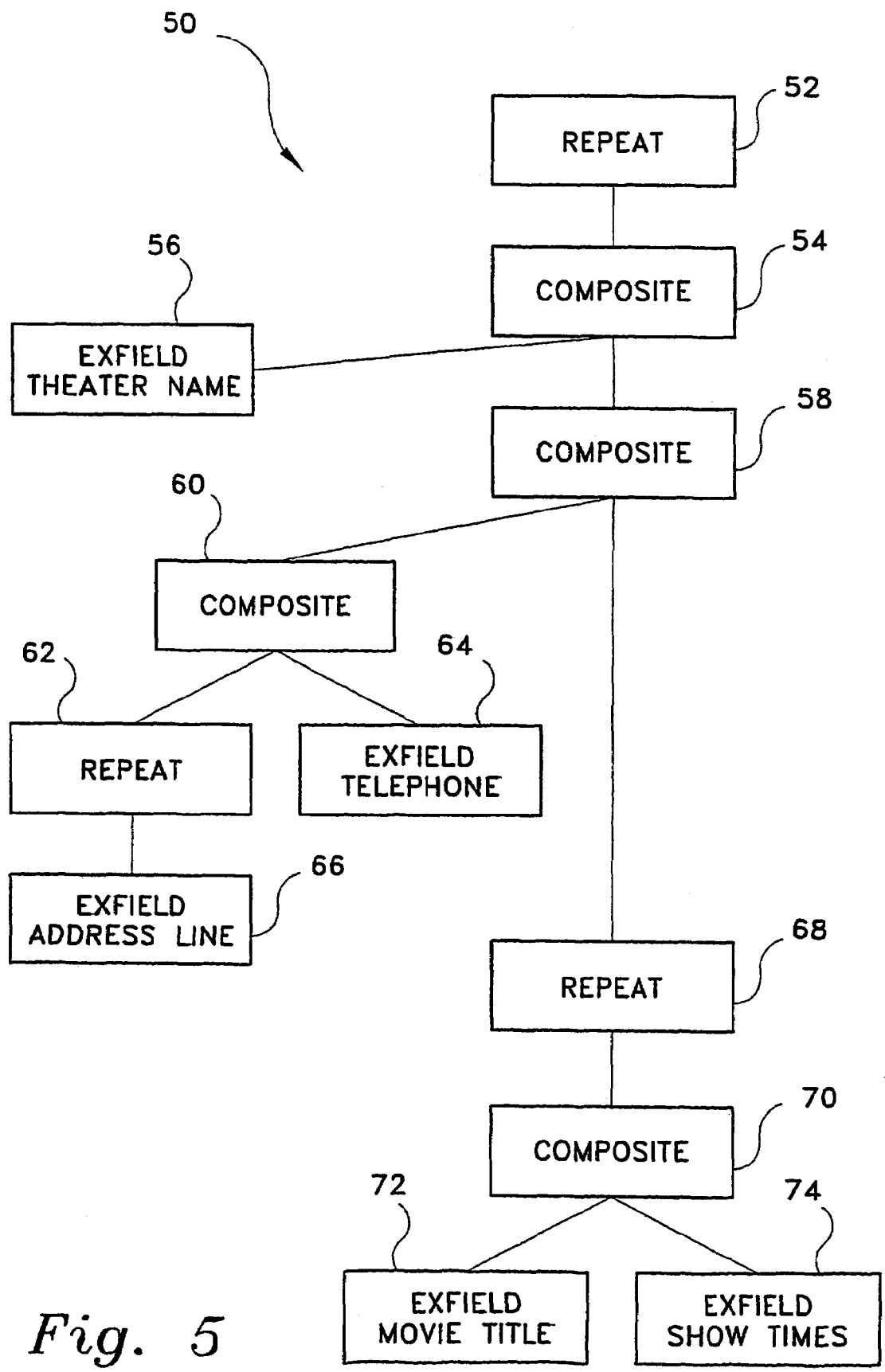
FIG. 5 is a block diagram of an extraction template according to the present invention directed to the movie web page example.

See FIG. 5 for an example of a structure template.

Instance Tree. An instance tree is a tree derived from the structure template and the filtered node array. An instance tree is a tree of instances. There are three types of instances: repeat instances, composite instances, and ExField instances.

A repeat instance is represented by IRepeat(I1,I2, . . . Ik), where I1,I2, . . . Ik are instances.

A composite instance is represented by IComposite(I1, I2, . . . Ik) where I1,I2, . . . Ik are instances.

An ExField instance is represented by IExField (N), where N is a node.

Given a sequence S of nodes, IRepeat(I1,I2, . . . Ik) is an instance of SRepeat(E) with respect to S if S=S1S2 . . . Sk, and I1 is an instance of E with respect to S1,I2 is an instance of E with respect to S2, . . . Ik is an instance of E with respect to Sk.

Given a sequence S of nodes, IComposite(I1,I2, . . . Ik) is an instance of SComposite(E1,E2, . . . Ek) if for some S1, S2, . . . Sk, S=S1S2 . . . Sk and I1 is an instance of E1 with respect to S1, I2 is an instance of E2 with respect to S2, . . . Ik is an instance of Ek with respect to Sk.

Given a sequence S of nodes, I is an instance of IChoice (E1,E2, . . . Ek) if for some j≦k, I is an instance of Ej with respect to S.

Given the node N, IExField(N) is an instance of SExField (C) if N matches C.

The recursive function Instantiate, illustrated in FIGS. 9, 10, 11, 12, and 13, can be used for finding the instantiation of a given structure template with respect to a node array.

Figure 2A:
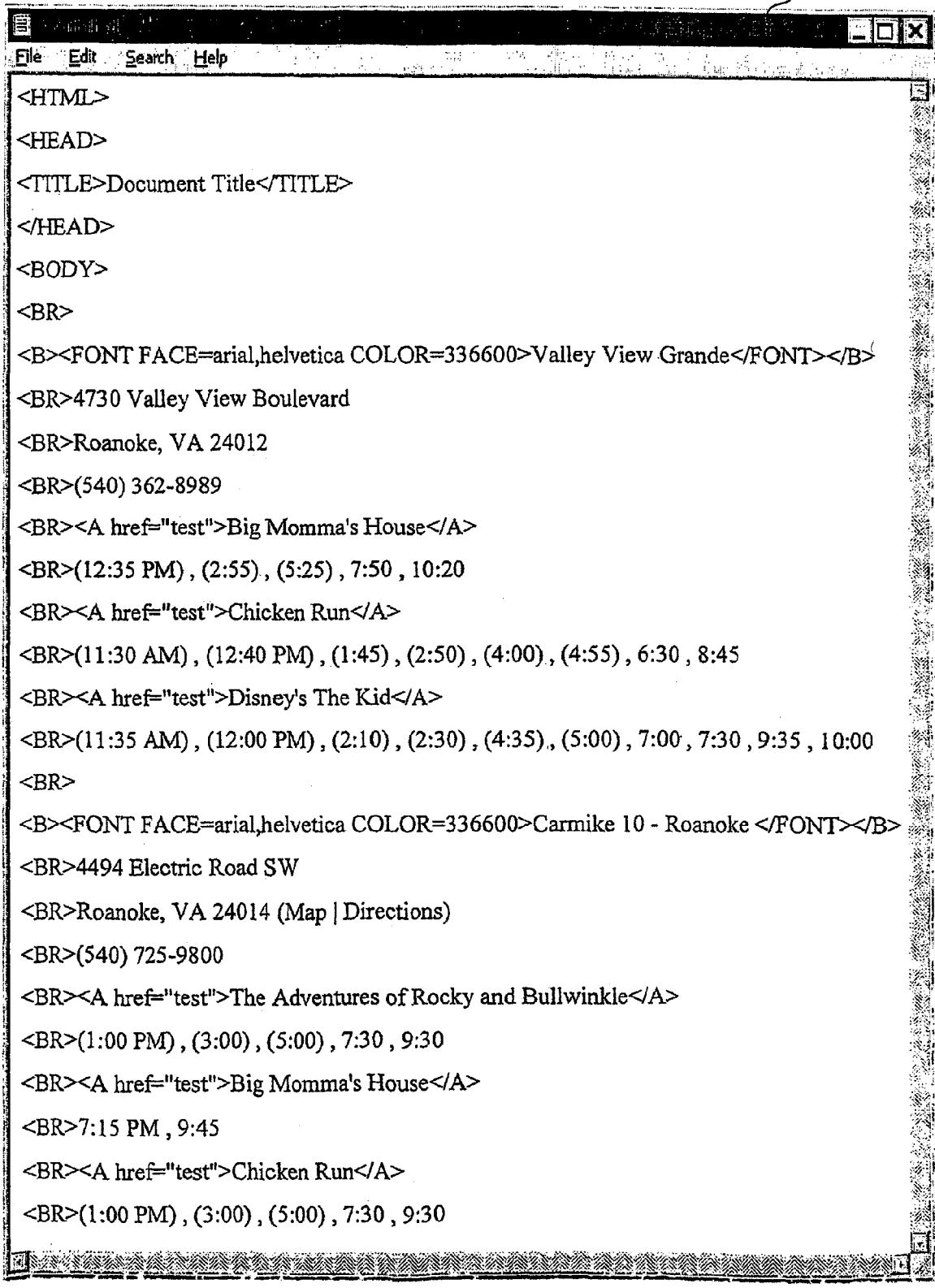
FIGS. 2a and 2b show HTML source code for the movie web page example shown in FIG. 1.
Figure 2B:
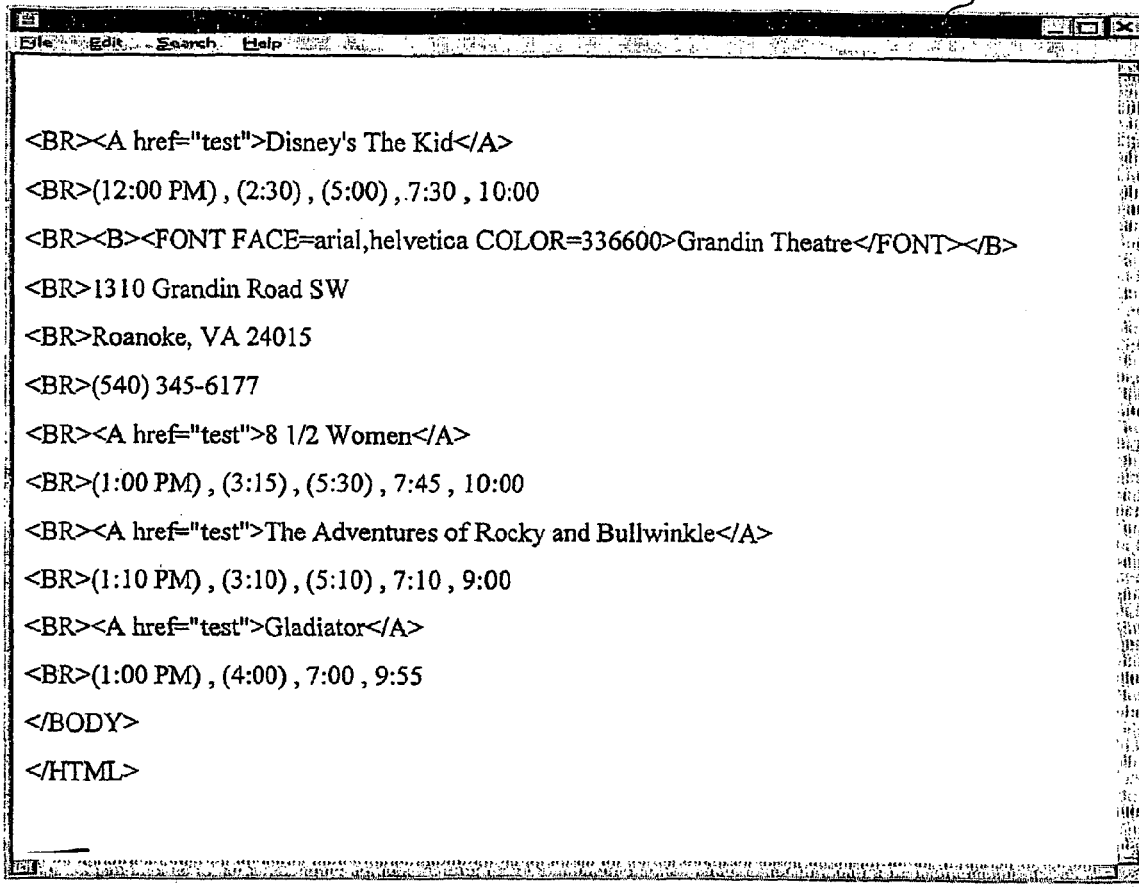

There are two types of structures inherent in many HTML files generated by widely used web sites. The first structure is the structure of the HTML parse tree, which is made explicit by parsing the file according to the grammar of HTML. See, for example, FIGS. 2a and 2b, which shows the parsed code 20, 22 of the HTML document 10 shown in FIG. 1 as that code might be shown in an HTML editor. The second, deeper, structure is not always formalized by the HTML grammar, but exists in the information in the page nonetheless. As an example, consider the HTML parse tree in FIGS. 3a and 3b, which represents the parse tree for the sample document of FIGS. 1 and 2a–2b. The parse tree is relatively flat, and does not reflect the deeper structure of the data, where every theater has an address and telephone as well as a number of movies, and every movie has a list of show times. The procedure extracts the deeper structure of the information in the page in a two phase process. In the first phase, a standard HTML parser is used to generate the HTML parse tree, and standard path constraints are used to create an array of nodes from an annotated tree, such as the example annotated tree shown in FIGS. 4a and 4b.

Figure 4B:
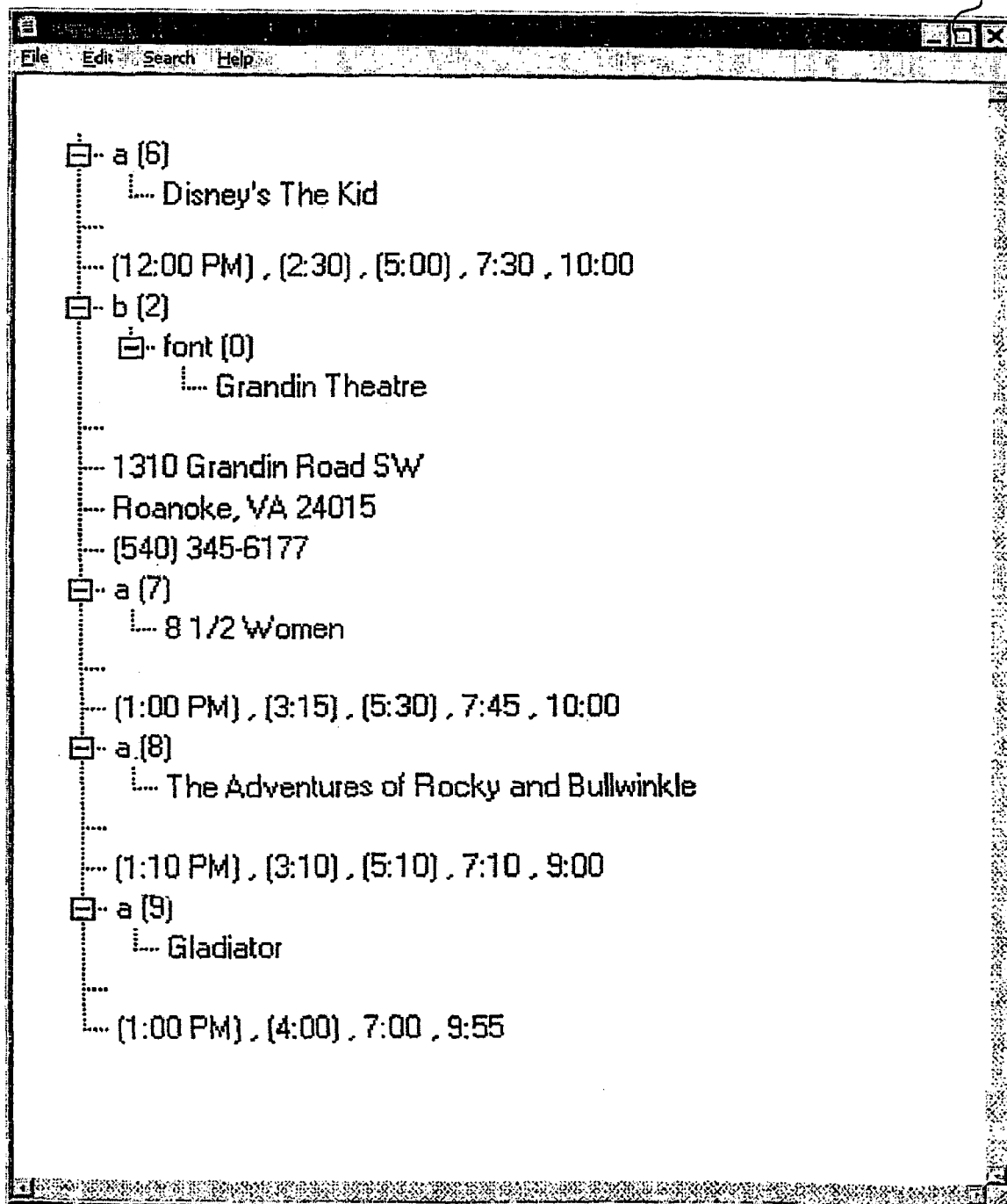

An example set of constraints used to form an extraction template from the annotated parsed tree of FIGS. 4a and 4b might include the following:

Theater Name Constraint: (html 0) (body 0) (b *) (font 0)(text 0)

Address Line Constraint: ((html 0) (body 0) (text *) & ~regexp{(\d\d\d) \d\d\d-\d\d\d\d})

Telephone Constraint: regexp{(\d\d\d) \d\d\d-\d\d\d\d} (this is a regular expression that matches phone numbers)

Movie Title Constraint: (html 0)(body 0)(a *)(text 0)

Show Times Constraint: (html 0)(body 0)(text *)

In the second phase, the node array is analyzed again using the structure template and the instantiate procedure, creating the deeper information structure inherent in the page. A sample structure template that, together with the set of constraints comprised of the Theater Name Constraint, Address Line Constraint, Telephone Constraint, Movie Title Constraint, and Show Times Constraint, can be used to form the extraction template for the annotated parsed tree of FIGS. 4a and 4b is shown in FIG. 5. The structure template 50 contains a repeat element 52 which has as its single child a composite element 54. Composite element 54 has two children: ExField element 56 and composite element 58. ExField Element 56 has an associated constraint, namely, the Theater Name Constraint. Composite element 58 has two children: composite element 60 and repeat element 68. Composite element 60 has two children: repeat element 62 and ExField element 64. Repeat element 62 has as its single child ExField element 66. The associated constraint of ExField element 64 is the Telephone Constraint, and the associated constraint of ExField element 66 is the Address Line Constraint. Repeat element 68 has as its single child composite element 70. Composite element 70 has two children: Exfield element 72 and Exfield element 74. The associated constraint of ExField element 72 is the Movie Title Constraint, and the associated constraint of ExField element 74 is the Show Times Constraint.

Figure 6:
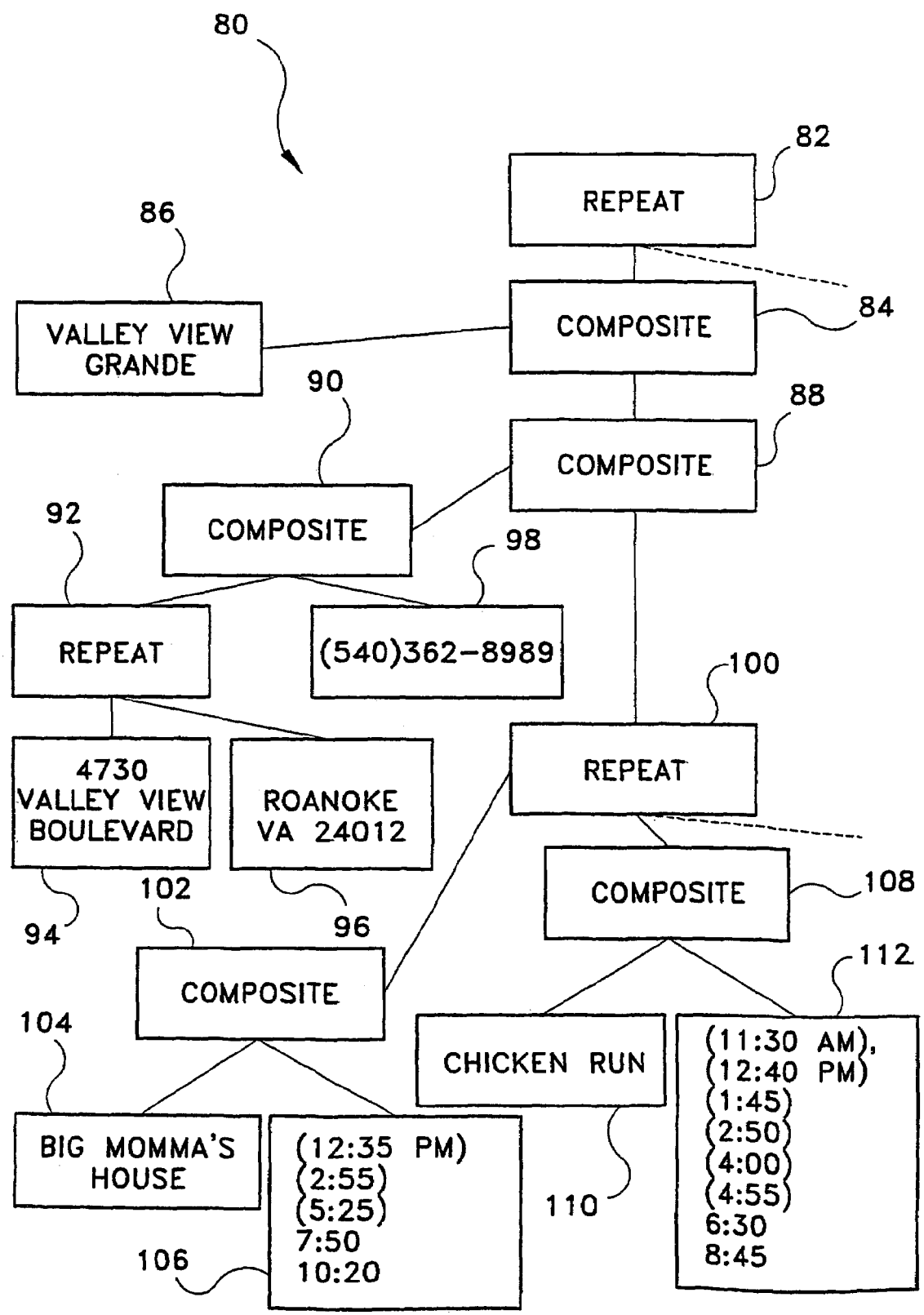
FIG. 6 is an instance tree of the movie web page example according to the present invention.

As an example, consider the instance tree 80 (shown in FIG. 6) generated by this structure template 50 and the instantiate procedure for the example page of FIGS. 4a and 4b. There the underlying structure of the data, i.e. the fact that a theater is associated with an address, a telephone, and a number of movies, and each movie is associated with a list of show times, has been captured. In particular, the instance tree 80 shows a repeat instance 82, each one of whose children contains the information relating to a particular theater (only the first child of repeat instance 82, depicting the information relating to Valley View Grande theater is shown in FIG. 6, the dashed line at 82 indicating that other similar instances for the remaining theaters are generated by the instantiate procedure). The first child of repeat instance 82 is composite instance 84, whose children are ExField instance 86, representing the theater name, and composite instance 88. The children of composite instance 88 are composite instance 90 and repeat instance 100. The children of composite instance 90 are repeat instance 92, and ExField instance 98, which contains the telephone number of the theater. The children of repeat instance 92 are ExField instances 94 and 96, which are the first and second lines of the theater's address, respectively. Each child of repeat instance 100 is a composite instance that contains information about one movie shown at this theater (in FIG. 6 only two such movies are shown, the dashed line at repeat instance 100 indicating that similar instances for the remaining movie titles are generated by the instantiate procedure). The first child of repeat instance 100 is composite instance 102, which contains information about the movie 'Big Momma's House'. The first child of composite instance 102 is ExField instance 104, indicating the movie's title, and the second child of 102 is the ExField instance 106, which shows the movie's show times. The second child of repeat instance 100 is composite instance 108, which contains information about the movie 'Chicken Run'. The first child of composite instance 108 is ExField instance 110, indicating the movie's title, and the second child of 108 is the ExField instance 112, which shows the movie's show times.

The idea of using a structure template to describe the hidden structure of the information, and the method by which a second phase is achieved is new. The ideas, and procedures, used in the first phase are already described in the literature, but they are not a pre-requisite for achieving the second phase.

Figure 7:
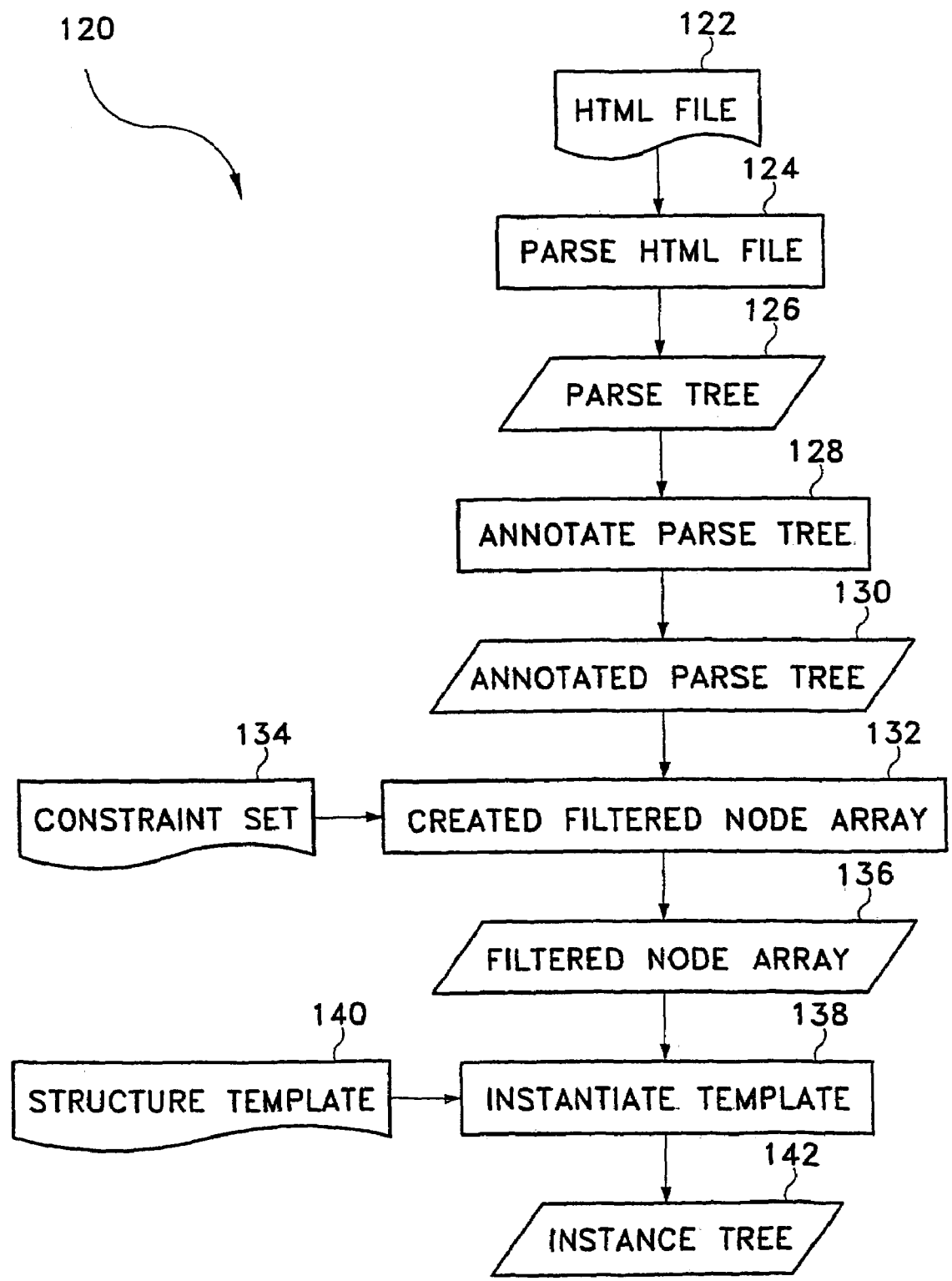
FIG. 7 is a process flow chart for creating an instance tree from a source HTML file and an extraction template according to the present invention.

In summary, FIG. 7 shows the main steps of the procedure 120 that is the subject of this invention. Of the steps involved in this procedure 120, steps (1), (2), and (3) (parsing 124 the HTML file 122, annotating 128 the parse tree 126 to form annotated parse tree 130, and applying path constraints 134 are not new. What is new about this procedure is the creation 132 of a filtered node array 136, and the application 140 of the structure template to this array 136 in an instantiate template 138 to create an instance tree 142. Structure templates have some similarities to context free grammar, but they are not grammars in the strict sense. While grammars apply to strings created from a predetermined alphabet, structure templates apply to arrays of nodes, where each node has a node signature and node text. The terminal nodes of a grammar are members of an alphabet, but the leaf elements of a structure template are constraints that apply to nodes. The instantiate procedure is similar to a recursive descent parser, but it applies to node arrays and creates an instance tree, rather than applying to a string of symbols and crating a parse tree. At its core, a recursive descent parser matches a terminal node against an input symbol. At the core of the instantiate procedure, constraints are applied to nodes.

FIG. 8 shows a flowchart of the recursive function GetNodeArray(Node, Constraints, Array) 150 which is used to create 132 the array of nodes 136. The function 150 takes three parameters which are passed by reference: Node (a node in the parse tree), Constraints (the set of constraints in the Extraction Template used to filter the nodes), and Array (an array holding the nodes which are accepted). To generate the node array for an entire HTML parse tree, the function is called with the top node of the parse tree as Node and an empty array of nodes as Array. Each time the function 150 is called, the function 150 starts 152 by testing 154 whether Node matches a constraint. If Node matches a constraint, Node is added 156 to the end of Array and the function returns 158 execution to the calling function. If Node does not match a constraint, for each child of Node the function 150 recursively calls itself by initializing 160 certain local variables (CT, COUNT, j), testing 162 the counter, j, to see if each child has been tested, and calling 164 the function for each child node and subsequently incrementing the counter, j. When the function has been applied to all child nodes, the function 150 returns 158 to the calling function.

Figure 9:
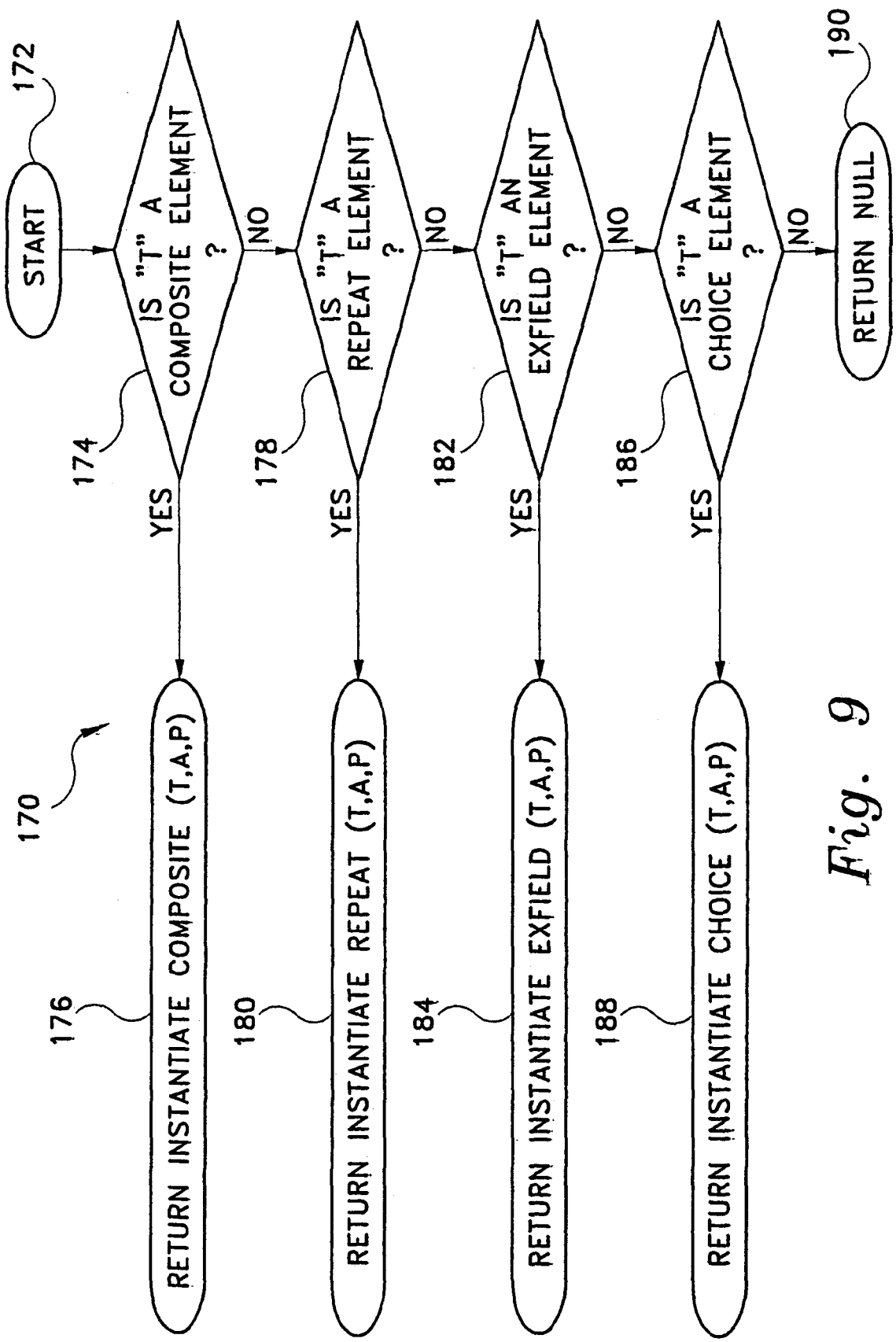
FIG. 9 is a flowchart of a general Instantiate function for generating an instantiated tree according to the present invention.

FIG. 9 shows a flowchart of the Instantiate(T,A,P) function 170 for instantiating the filtered node array 136 to form the instance tree 142. The function 170 takes three parameters which are passed by reference, T (a structure template element), A (the filtered array of nodes 136), and P (an integer index into A, the index being zero based). This function has a return value. If the instantiation of T is unsuccessful, then the function returns the NULL value 190. If the instantiation of T is successful, P is incremented to point just beyond the nodes tested by the function during the function call. Each time the function 170 is called, the function 170 starts 172 by testing 174 whether T is a composite element, and if so, calls the function InstantiateComposite (T,A,P) (described below in FIG. 10) and returns 176 the return value of that function. Otherwise, the function 170 tests 178 whether T is a repeat element, and if so, calls the function InstantiateRepeat (T,A,P) (described below in FIG. 11) and returns 180 the return value of that function. Otherwise, the function 170 tests 182 whether T is an ExField element, and if so, calls the function InstantiateExfield (T,A,P) (described below in FIG. 12) and returns 184 the return value of that function. Otherwise, the function 170 tests 186 whether T is a choice element, and if so, calls the function InstantiateChoice (T,A,P) (described below in FIG. 13) and returns 188 the return value of that function. Otherwise, the function 170 returns 190 NULL.

Figure 10:
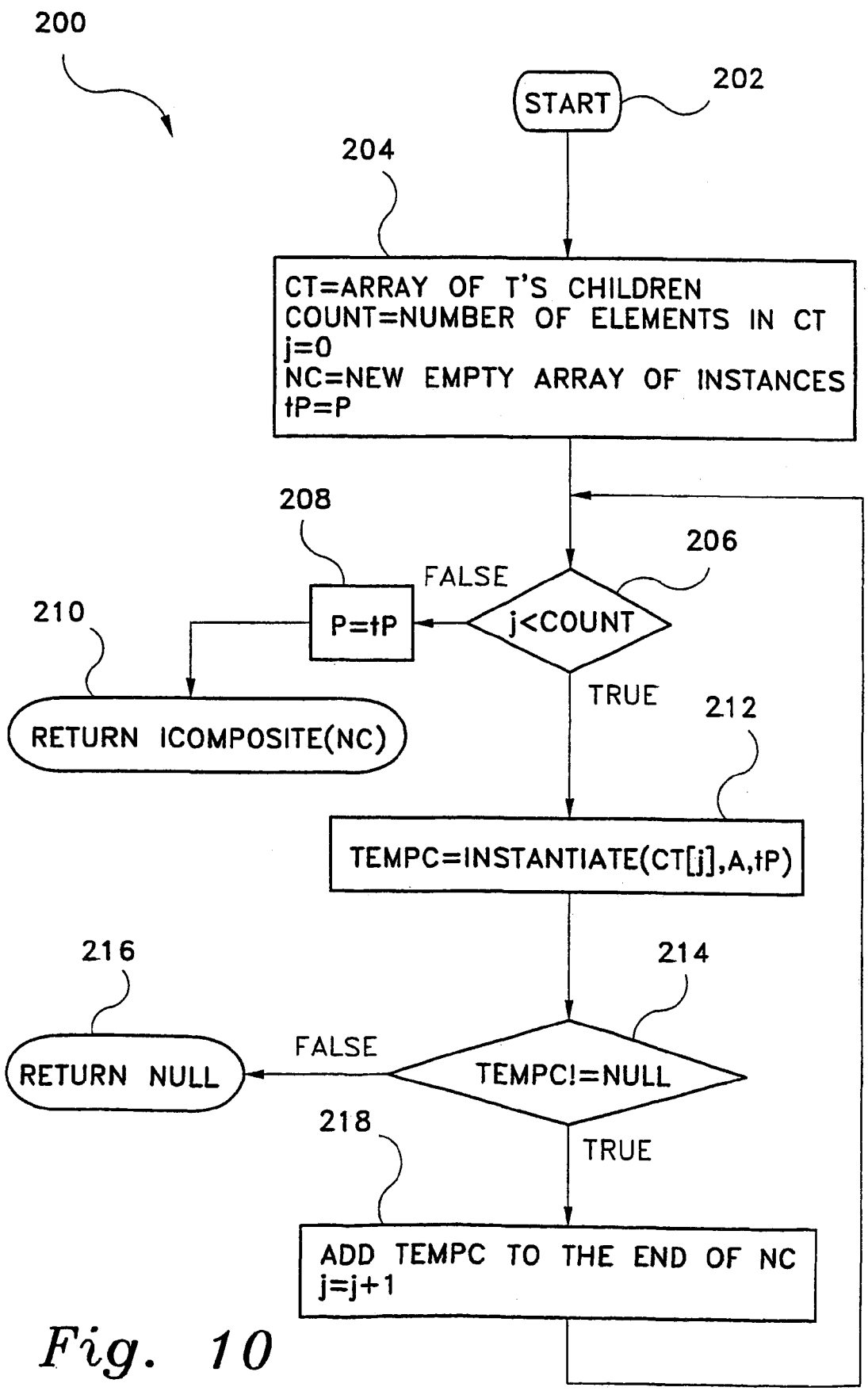
FIG. 10 is a flowchart of an instantiate composite function according to the present invention.

FIG. 10 shows a flowchart of the function 200 InstantiateComposite(T,A,P) for instantiating a composite structure template element. The function 200 takes three parameters which are passed by reference, T (a structure template element), A (the filtered array of nodes 136), and P (an integer index into A, the index being zero based). This function 200 has a return value. If the instantiation of T is unsuccessful, then the function returns the NULL value 216. If the instantiation of T is successful, P is incremented to point just beyond the nodes tested by the function during the function call. Each time the function 200 is called, the function 200 starts 202 by initializing 204 the local variables CT (an array initialized to element T's children), COUNT (an integer initialized to the number of T's children), j (an index into the array CT, initialized to zero), NC (an array of instances, initialized to empty) and tP (an index into A, initialized to P). The function 200 then enters a loop which calls Instantiate function 170 for each child of the composite element T until either all the children of the composite element have been completely instantiated or one of them fails to instantiate, in which case the function 200 exits with return value NULL. The function 200 tests 206 the counter j to determine whether it is less than the number of T's children (COUNT), and if so, calls 212 the Instantiate function 170 for the corresponding child element (CT[j]) of the composite element T. The return value of the call to Instantiate function 170 is tested 214, and if the value is NULL, the InstantiateComposite function 200 returns NULL 216. If the return value of the call to the Instantiate function at step 212 is not NULL, the return value is added 218 to the end of the array NC, the counter j is incremented, and the loop returns to the test at step 206. If all the children of the composite element T have been instantiated, P (the index to array A) is updated 208 and the function 200 returns 210 a composite instance whose children are the elements of the array NC.

Figure 11:
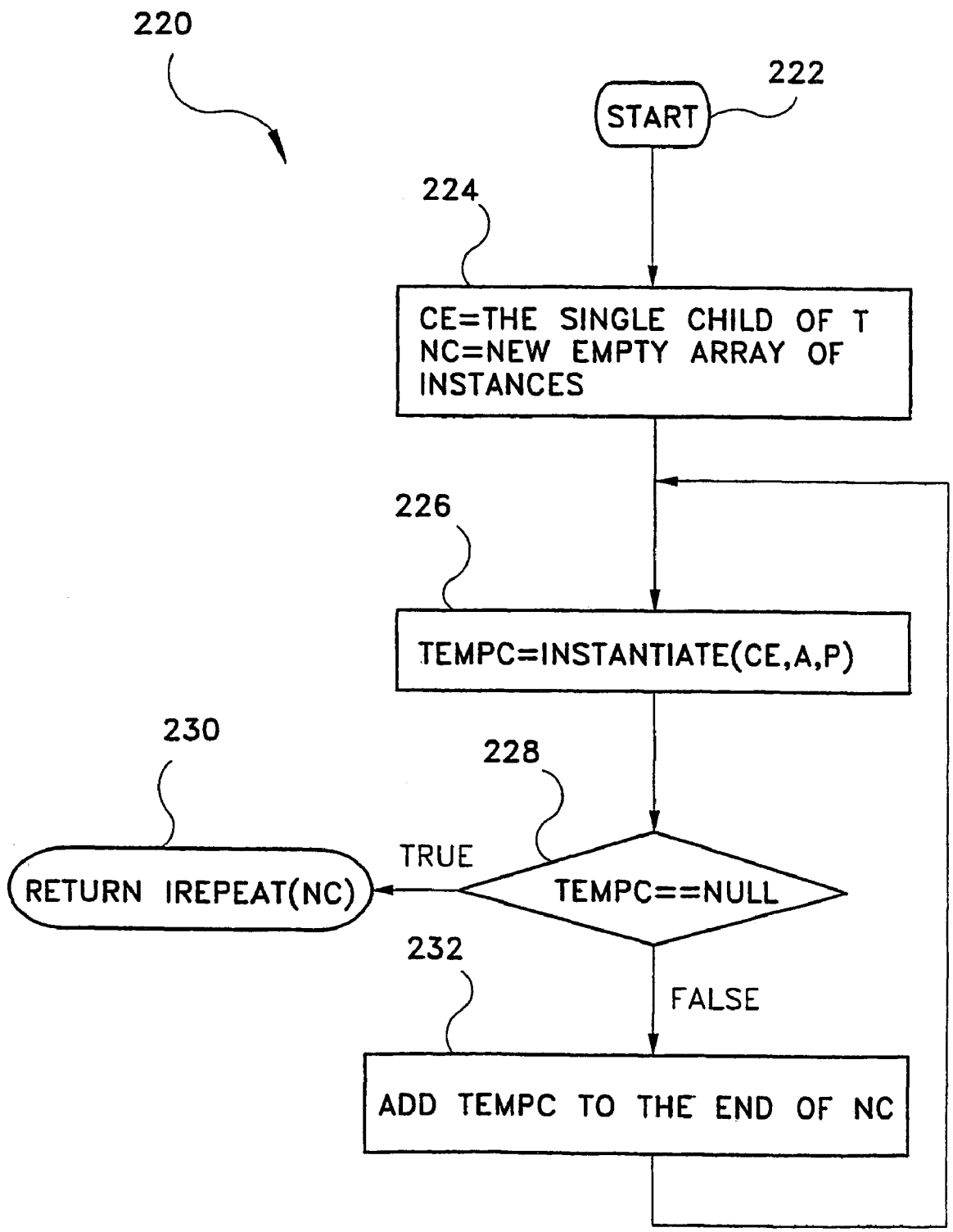
FIG. 11 is a flowchart of an instantiate repeat function according to the present invention.

FIG. 11 shows a flowchart of the function 220 InstantiateRepeat(T,A,P) for instantiating a repeat element of the structure template. The function 220 takes three parameters which are passed by reference, T (a structure template element), A (the filtered array of nodes 136), and P (an integer index into A, the index being zero based). This function 200 has a return value, namely, the instantiation of the repeat element T. If the instantiation of T is successful, P is incremented to point just beyond the nodes tested by the function during the function call. Each time the function 220 is called, the function 220 starts 222 by initializing 224 the local variables CE (an element initialized to element T's single child) and NC (an array of instances, initialized to empty). The function 220 then enters a loop in which the single child of the repeat element (CE) is repeatedly instantiated against the nodes in A, the pointer P into A being incremented each time by the successful instantiation of CE. In the loop the function calls 226 the Instantiate function 170 with the parameters CE, A, and the array NC. The loop continues until the function call 226 returns the NULL value 228, at which point the function 220 returns 230 a repeat instance whose children are the members of the array NC.

Figure 12:
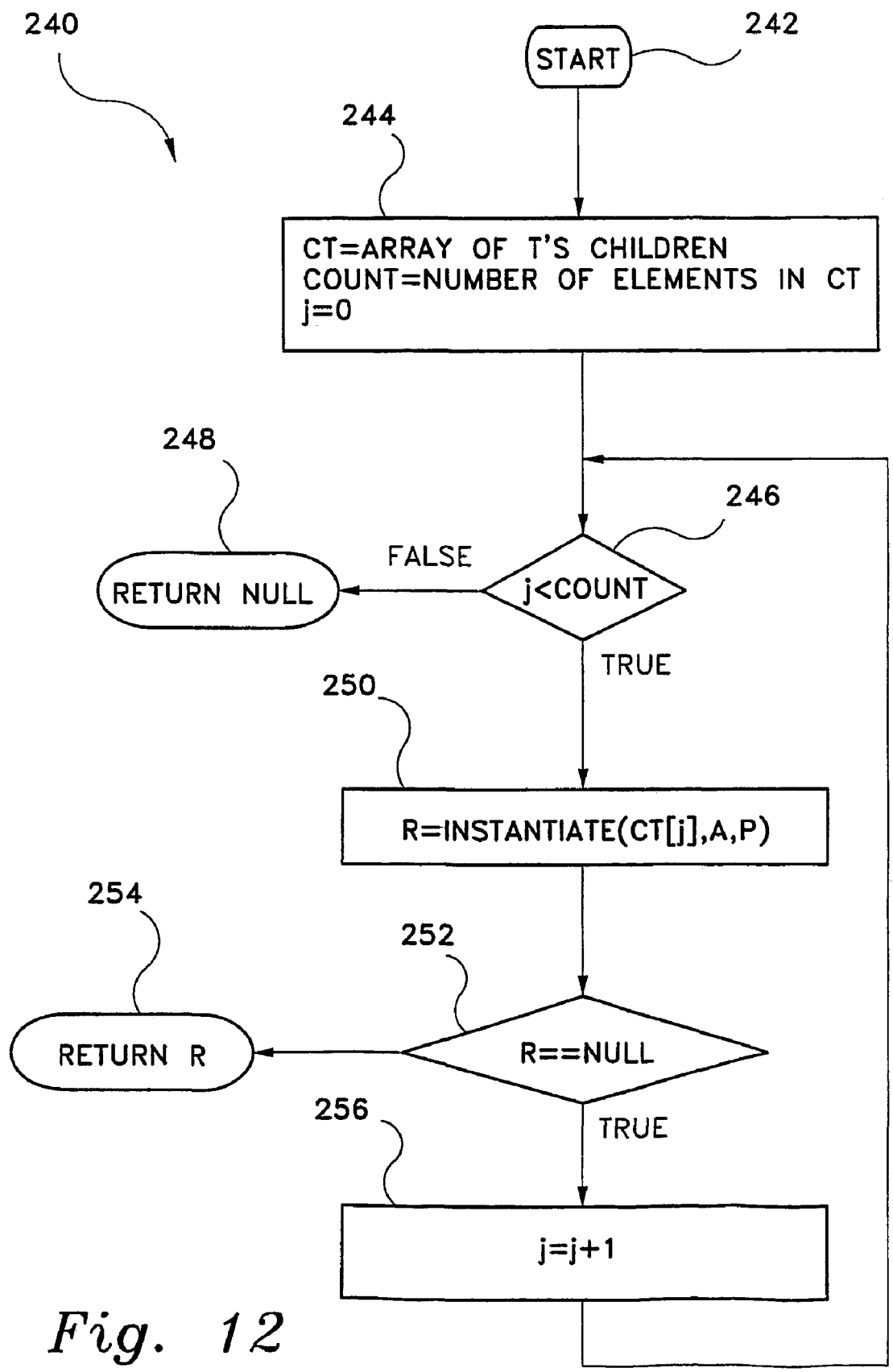
FIG. 12 is a flowchart of an instantiate choice function according to the present invention.

FIG. 12 shows a flowchart of the function 240 InstantiateChoice(T,A,P) for instantiating a choice element of the structure template. The function 240 takes three parameters which are passed by reference, T (a structure template element), A (the filtered array of nodes 136), and P (an integer index into A, the index being zero based). This function 240 has a return value. If the instantiation of T is unsuccessful, then the function 240 returns the NULL value. If the instantiation of T is successful, P is incremented to point just beyond the nodes tested by the function during the function call. Each time the function 240 is called, the function 240 starts 242 by initializing 244 the local variables CT (an array of T's children), COUNT (number of elements in CT), and a counter j, initialized to zero. The function 240 then enters a loop until at least one of T's children is successfully instantiated or the children of T have been exhausted. The function 240 tests 246 counter j to determine if all of T's children have been unsuccessfully tried. If so, the function 240 returns 248 NULL, otherwise the function calls 250 the Instantiate function 170 for the corresponding child (CT[j]) and tests 252 the return value. If the function call 250 returns NULL the counter j is incremented 256 and the loop returns to the test step 246. Otherwise, the function 240 returns 254 the return value of the function called at step 250 as the instantiation of the choice element.

Figure 13:
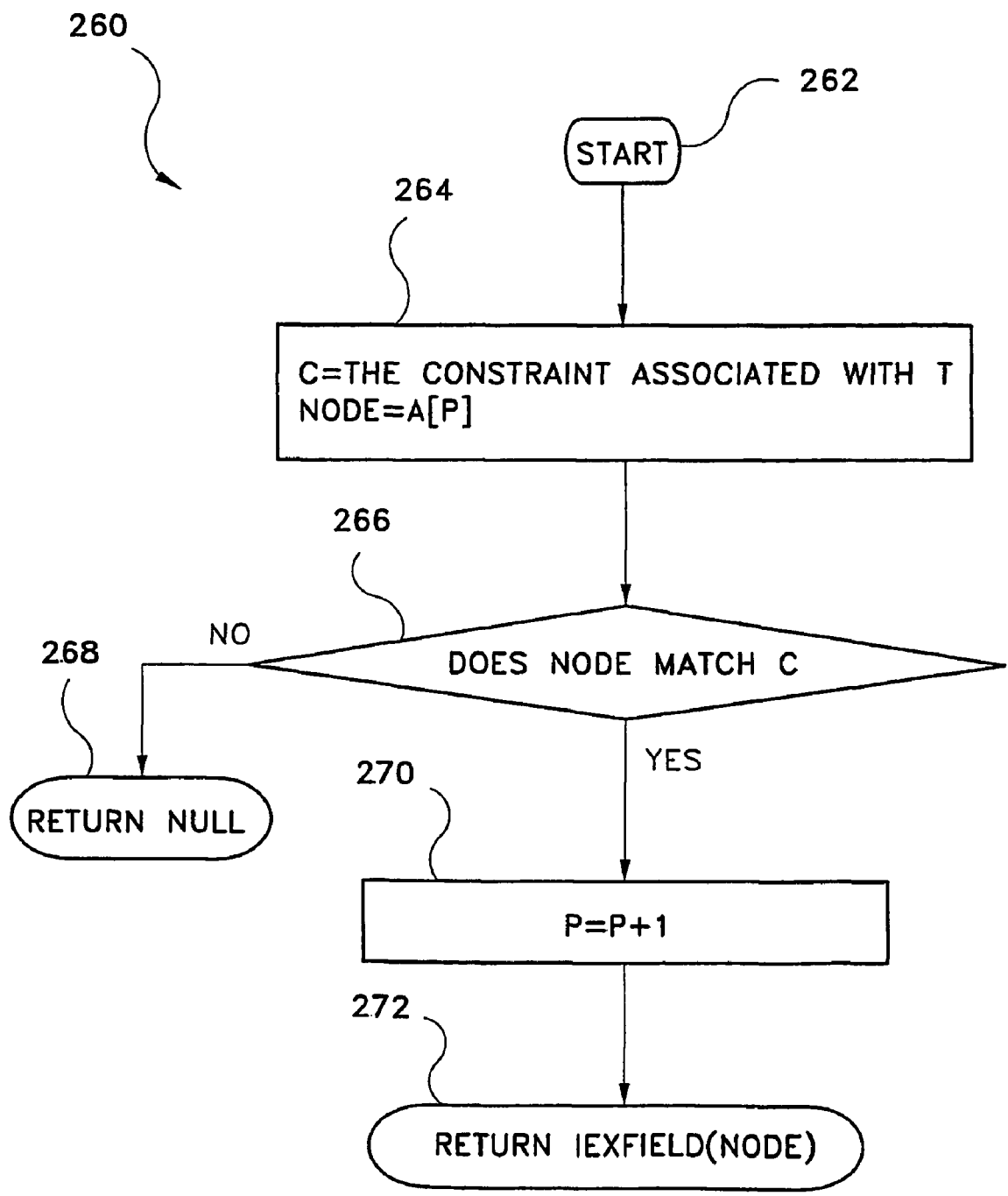
FIG. 13 is a flowchart of an instantiate ex field function according to the present invention.

FIG. 13 shows a flowchart of the InstantiateExField(T,A,P) function 260. The function 260 takes three parameters which are passed by reference, T (a structure template element), A (the filtered array of nodes 136), and P (an integer index into A, the index being zero based). This function 260 has a return value. If the instantiation of T is unsuccessful, then the function 260 returns the NULL value. If the instantiation of T is successful, P is incremented to point just beyond the nodes tested by the function during the function call. Each time the function 260 is called, the function 260 starts 262 by initializing 264 the local variable C to the constraint associated with T. The function 260 then tests 266 whether the node pointed to by P matches the constraint C. If so, the function 260 increments 270 the pointer P and returns 272 the instantiated ExField element. Otherwise, the function 260 returns NULL 268.

It will be obvious to those skilled in the art that the GetNodeArray and Instantiate functions may be written in a mid-level computer language C, or high level languages such as C++, Visual Basic, and Java, or in a scripting language, such as JavaScript, Perl, or VBScript.

It will further be obvious to those skilled in the art that the GetNodeArray function and each of the Instantiate functions according to the method of the present invention may be encoded as program code on a computer readable medium for execution on a computer. As used in the present application, the term "computer readable medium" includes a hard disk drive, a floppy drive or floppy disk, a compact disk drive or compact disk, a digital video disk (DVD) drive or DVD disk, a ZIP drive or ZIP disk, magnetic tape and any other magnetic medium, punch cards, paper tape, memory chips, or any other medium from which a computer can read.

It is to be understood that the present invention is not limited to the embodiments described above, but encompasses any and all embodiments within the scope of the following claims.

I claim:

1. A method for extracting structured data from HTML pages, comprising the steps of:
    (a) parsing the input HTML file using a standard HTML parser, thereby creating a parse tree;
    (b) annotating the parse tree generated in step (a), thereby creating an annotated parse tree;
    (c) creating an array of nodes from the annotated parse tree generated in step (b) and a set of constraints, thereby creating a filtered node array; and
    (d) generating an instance tree by instantiating a given structure template with respect to the filtered node array generated by step (c), wherein the step of generating an instance tree further includes the step of instantiating a composite structure element with respect to a subsequence of the nodes in the filtered node array, thereby creating a composite instance, said step of instantiating a composite structure element includes the step of successively instantiating each of the children of said composite structure element with contiguous subsequences of the subsequence of the filtered node array;
    wherein step (c) further comprises the steps of:
        (i) examining each node of said annotated parse tree;
        (ii) comparing each node to at least one constraint of said set of constraints, each said constraint setting forth a data format requirement;
        (iii) accepting each node matching at least one constraint of said set of constraints into said filtered node array; and
        (iv) excluding each node not matching at least one constraint of said set of constraints from said filtered node array; and wherein
    the structure template comprises a plurality of structure elements arranged in a hierarchy;
    each structure element in said plurality of structure elements is selected from the group consisting of an ExField structure element, a composite structure element, a repeat structure element, and a choice structure element;
    said structure elements include at least one ExField structure element;
    said instance tree comprises a plurality of instances arranged in a hierarchy;
    each instance in said plurality of instances is selected from the group consisting of an ExField instance, a composite instance, and a repeat instance; and
    said instances include at least one ExField instance.

2. The method for extracting structured data from HTML pages according to claim 1, wherein the step of annotating the parse tree further comprises the steps of:
    assigning a label to each node in said parse tree; and
    assigning a signature to each node in said parse tree.

3. The method for extracting structured data from HTML pages according to claim 1, further comprising the step of providing the given structure template with respect to the filtered node array generated by step (c).

4. The method for extracting structured data from HTML pages according to claim 1, wherein said ExField structure element has an associated constraint.

5. The method for extracting structured data from HTML pages according to claim 1, wherein said structure elements include at least one composite structure element, and said composite structure element has an array of structure elements as the children of said composite structure element.

6. The method for extracting structured data from HTML pages according to claim 1, wherein said structure elements include at least one repeat structure element, and said repeat structure element has a single structure element as the child of said repeat structure element.

7. The method for extracting structured data from HTML pages according to claim 1, wherein said structure elements include at least one choice structure element, and said choice structure element has an array of structure elements as the children of said choice structure element.

8. The method for extracting structured data from HTML pages according to claim 1, wherein said instances include at least one composite instance, and said composite instance has an array of instances as the children of said composite instance.

9. The method for extracting structured data from HTML pages according to claim 1, wherein said instances include at least one repeat instance, and said repeat instance has an array of instances as the children of said repeat instance.

10. The method for extracting structured data from HTML pages according to claim 1, wherein the step of generating an instance tree further includes the step of instantiating a selected node from said filtered node array into an ExField structure element in said given structure template if the selected node matches a constraint associated with the ExField structure element.

11. The method for extracting structured data from HTML pages according to claim 1, wherein the step of generating an instance tree further includes the step of instantiating an ExField structure element in said structure template with respect to a selected node from said filtered node array if said selected node matches a constraint associated with said ExField structure element, thereby creating an ExField instance.

12. A method for extracting structured data from HTML pages, comprising the steps of:
  (a) parsing the input HTML file using a standard HTML parser, thereby creating a parse tree;
  (b) annotating the parse tree generated in step (a), thereby creating an annotated parse tree;
  (c) creating an array of nodes from the annotated parse tree generated in step (b) and a set of constraints, thereby creating a filtered node array; and
  (d) generating an instance tree by instantiating a given structure template with respect to the filtered node array generated by step (c), wherein the step of generating an instance tree further includes the steps of recursively comparing each structure element of a composite structure element in the given structure template to the nodes in said filtered node array to determine whether each structure element in the composite structure element is matched to a corresponding composite structure in said filtered node array and adding any said corresponding composite structure to the instance tree.

13. The method for extracting structured data from HTML pages according to claim 12, wherein the step of annotating the parse tree further comprises the steps of:
  assigning a label to each node in said parse tree; and
  assigning a signature to each node in said parse tree.

14. The method for extracting structured data from HTML pages according to claim 12, wherein the step of creating the array of nodes further comprises the steps of:
  comparing each node to a constraint setting forth a data format requirement;
  accepting each node matching a constraint into the filtered node array; and
  excluding each node not matching a constraint from the filtered node array.

15. The method for extracting structured data from HTML pages according to claim 12, further comprising the step of providing the given structure template with respect to the filtered node array generated by step (c).

16. The method for extracting structured data from HTML pages according to claim 12, wherein the given structure template comprises a plurality of structure elements arranged in a hierarchy.

17. The method for extracting structured data from HTML pages according to claim 16, wherein each structure element in said plurality of structure elements is selected from the group consisting of an ExField data structure element, a composite data structure element, a repeat data structure element, and a choice data element.

18. The method for extracting structured data from HTML pages according to claim 17, wherein said ExField data structure element has an associated constraint.

* * * * *